United States Patent [19]

Toriumi et al.

[11] 4,294,390
[45] Oct. 13, 1981

[54] PINCH ROLLER MECHANISM

[75] Inventors: Takeshi Toriumi, Sagamihara; Tamotsu Tominaga, Akishima, both of Japan

[73] Assignee: Hitachi Denshi Kabushiki Kaisha, Tokyo, Japan

[21] Appl. No.: 85,377

[22] Filed: Oct. 16, 1979

[30] Foreign Application Priority Data

Oct. 23, 1978 [JP] Japan .................................. 53-146353

[51] Int. Cl.³ .......................................... B65H 17/22
[52] U.S. Cl. ..................................... 226/181; 242/208
[58] Field of Search ............... 226/181, 182, 183, 186, 226/187, 190, 194; 242/201–210

[56] References Cited

U.S. PATENT DOCUMENTS

| 3,217,997 | 11/1965 | Lundgren et al. | 242/55.19 A |
| 3,669,331 | 6/1972 | Renold | 226/176 |
| 3,850,355 | 11/1974 | Downie et al. | 226/187 X |

Primary Examiner—Leonard D. Christian
Attorney, Agent, or Firm—Blakely, Sokoloff, Taylor & Zafman

[57] ABSTRACT

A pinch roller of a portable video tape recorder is urged against a capstan shaft by a rotatable arm rotated by an eccentric cam. The arm is provided with a pin spring biased against side surface of the eccentric cam. After a portion of side surface of the eccentric cam most remote from an axis of rotation of the cam has passed by the pin, the rotation of the eccentric cap is stopped thereby to prevent the pinch roller from disengaging the capstan shaft.

3 Claims, 7 Drawing Figures

PINCH ROLLER MECHANISM

BACKGROUND OF THE INVENTION

This invention generally relates to a pinch roller mechanism.

A prior art pinch roller mechanism of a portable type video tape recorder for commercial use is constructed such that the linear attractive force produced by a solenoid coil is converted into a swinging motion of a pinch roller arm via links or levers, so as to urge the pinch roller against a capstan shaft. One may refer to a literature, as disclosing such a prior art mechanism, entitled "High Fidelity Tape Recorder", pp. 183-197, published Nov. 10, 1969 by Radio Gizyutsu-sha in Japan.

The prior art pinch roller mechanism, however, consumes a large quantity of electric power because it is necessary to energize the solenoid coil when the pinch roller is urged against the capstan shaft. Moreover, it is necessary to use links or levers for the purpose of converting the linear attractive force produced by the solenoid coil into the swinging motion of the pinch roller arm, and the link or lever mechanism becomes not only sophisticated but also unreliable.

SUMMARY OF THE INVENTION

Accordingly, it is an object of this invention to provide an improved pinch roller mechanism of minimized power consumption which can prevent a pinch roller from disengaging a capstan shaft after the pinch roller has been urged against capstan shaft.

According to this invention, there is provided a pinch roller mechanism comprising a source of rotary motion, an eccentric cam rotated by the source, a capstan shaft, a pinch roller, an arm urged against the side surface of the eccentric cam and supporting the pinch roller, means for urging the pinch roller against the capstan shaft when the arm is rotated, and control means for controlling energization of the source.

DESCRIPTION OF THE PREFERRED EMBODIMENT

Figure 1:
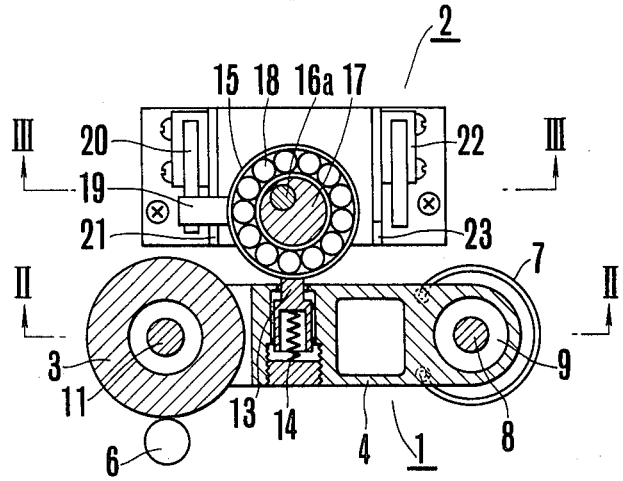
FIG. 1 is a plan view, partly in section, showing one embodiment of a pinch roller mechanism according to this invention.

A pinch roller mechanism shown in FIG. 1 comprises a pinch roller unit 1 and a pinch roller operating unit 2. The pinch roller unit 1 comprises a pinch roller 3 and a pinch roller arm 4 for moving the pinch roller along an arcuate path so as to urge the pinch roller 3 against a capstan shaft 6 mounted on a base 5. The pinch roller arm 4 is provided with a C-shaped spring 7 at a supporting shaft 8 on the base 5. The C-shaped spring 7 has a tendency to expand and its one end is connected to the pinch roller arm, while the other end to the base 5. Accordingly, the arm 4 is biased in the clockwise direction with respect to the base 5, in other words, in a direction to move the pinch roller 3 away from the capstan shaft 6.

Figure 2:
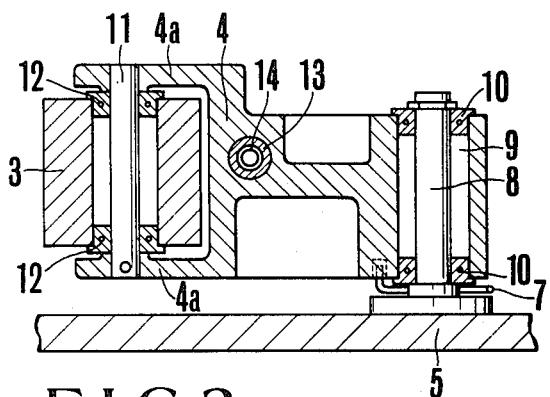
FIG. 2 is a sectional view taken along line II—II in FIG. 1.

As shown in FIG. 2, the supporting shaft 8 for the arm 4 which is secured to the base 5 extends through a relatively large opening 9 of the arm 4 and roller bearings 10 are interposed between the inner wall of the opening 9 and the shaft 8 to assure smooth rotation of the arm. The pinch roller 3 is mounted on the arm 4 via a U-shaped arm 4a integral therewith, which supports the shaft 11 of the pinch roller through roller bearings 12 in parallel with the capstan shaft 6.

A pin 13 is mounted in the arm 4 to project upwardly as viewed in FIG. 1. The pin 13 is caused to project by a coil spring 14, the extent of projection being limited by a shoulder of the pin 13. The force of spring 14 is selected to be larger than that of C-shaped spring 7 which acts to urge the arm in the clockwise direction.

Figures 3, 4:
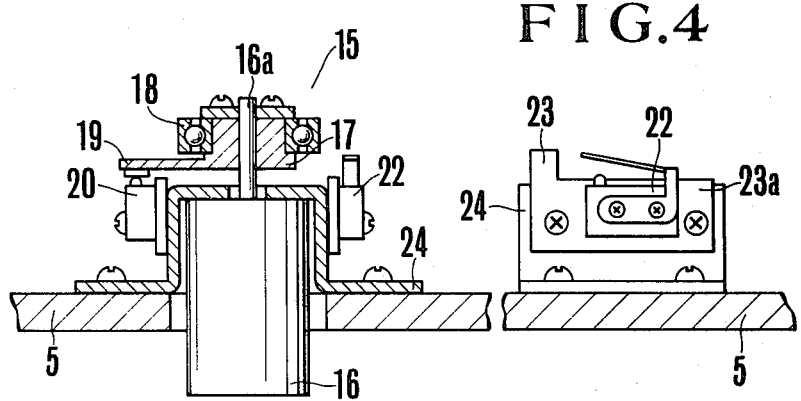
FIG. 3 is a sectional view taken along line III—III in FIG. 1.
FIG. 4 is a fragmentary side view of the mechanism shown in FIG. 3.

The pinch roller operating unit 2 comprises an eccentric cam 15 and a geared motor 16 for rotating the eccentric cam as shown in FIG. 3. The eccentric cam 15 is formed by fitting a ball bearing 18 on an eccentric shaft 17 secured to the shaft 16a of the motor 16. The projecting pin 13 of the pinch roller unit 1 is normally caused to engage the outer side surface of the race of the ball bearing 18. The eccentric shaft 17 is provided with a lever 19 extending in a direction perpendicular to the axis thereof. When the eccentric cam 15 rotates in the counterclockwise direction as viewed in FIG. 3, so that when a portion of the side surface of the eccentric cam 15 at the maximum distance from the shaft 16a confronts the pin 13, the lever 19 actuates a microswitch 20 and as the eccentric cam 15 rotates further in the same direction, the lever 19 is arrested by a stop 21. When the eccentric cam rotates in the clockwise direction and a portion of the side surface of the eccentric cam closest to the shaft 16a comes to a position immediately prior to confronting the projecting pin 13, the lever 19 operates a microswitch 22, and when the eccentric cam rotates further in the same direction, it is arrested by a stop 23. The microswitch 20 is used to stop an excessive, counterclockwise rotation of the motor 16 whereas the microswitch 22 is used to stop an excessive rotation of the motor 16. As shown in FIG. 4, the microswitch 22 is mounted on a base 23a with the stop 23, and the base 23a is secured to a frame 24 by means of which the motor 26 is mounted to the base 5.

Figure 5A:
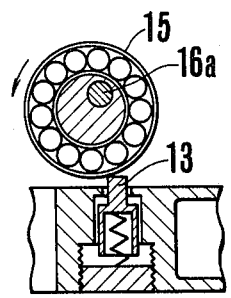
FIGS. 5A through 5C are sectional views to explain the operation of the pinch roller mechanism of this invention.
Figure 5B:
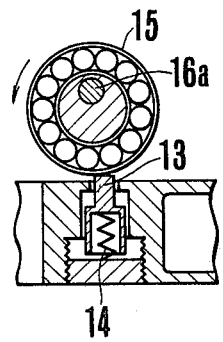
Figure 5C:
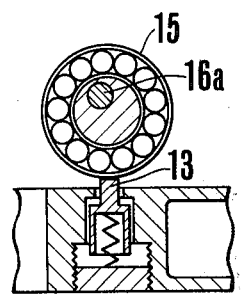

The pinch roller mechanism described above operates as follows. When a control device not shown, issues an instruction signal, the motor 16 is rotated in the counterclockwise direction to rotate the lever 19 of the eccentric cam 15 in the same direction so that the outer race of the ball bearing 18 urges inwardly the pin 13. However, since the spring 14 is stronger than the C-shaped spring 7 as described above, the force applied to the pin 13 by the eccentric cam will be transmitted to the arm 4 with the result that the pinch roller 3 is rotated about the shaft 8 in the counterclockwise direction until it comes to engage the capstan shaft 6. The pinch roller 3 begins to engage the capstan shaft immediately before, as shown in FIG. 5A, the eccentric cam 15 permits the pin 13 to displace to the maximum extent. As the eccentric cam 15 rotates further, the pin 13 is further urged inwardly as shown in FIG. 5B, attaining the inward maximum stroke of the pin 13 by compressing the spring 14. Under these conditions, the arm 4 causes the pinch roller 3 to urge against the capstan shaft 6 under a constant force defined by springs 7 and 14 and the lever 19 comes to operate the microswitch 20 to stop the motor 16. However, due to the inertia the motor 16 continues its rotation until the lever 19 engages the stop 21. This condition is shown in FIG. 5C. Under this condition, since the portion of the side surface of the eccentric cam 15 most remote from the motor shaft 16a has passed by a little the pin 13, the pin applies to the eccentric cam 15 a small torque to cause it to rotate in the counterclockwise direction, thus preventing it from rotating in the clockwise direction. This prevents the pinch roller 3 from disengaging the capstan shaft 6. The capstan shaft 6 and the pinch roller mechanism cooperates under these states to feed the magnetic tape.

After completion of the tape feeding, the control device supplies a release instruction. In response to this instruction, the motor 16 rotates in the clockwise direction so that the relative position between the eccentric cam 15 and the projecting pin 13 changes from that shown in FIG. 5C to FIG. 5A via that shown in FIG. 5B. Thereafter, as the eccentric cam 15 rotates, the pin projects outwardly until stopped by its shoulder. As the eccentric cam 15 rotates further to decrease the distance between shaft 16a and a position at which the pin 13 engages the periphery of the eccentric cam 15, the pinch roller arm 4 is rotated in the clockwise direction about shaft 8 by the force of the C-shaped spring 7, thus disengaging the pinch roller 3 from capstan shaft 6. Then, the lever 19 of the eccentric cam 15 actuates the microswitch 22 to stop the motor 16. However, due to its inertia the motor 16 continues its rotation until the lever 19 engages the stop 23. At this time, the pin 13 engages a portion of the eccentric cam 15 closest to shaft 16a so that the pinch roller 3 is spaced from the capstan shaft 6 by a sufficient distance.

With the pinch roller mechanism described above, since the pinch roller 3 is urged against and separated from the capstan shaft 6 by the arm 4 operated by the eccentric cam 15, the construction is simplified. Further, the reliability is improved with this construction by eliminating parts which jump in operation and hence are liable to be worn.

Moreover, since the motor for rotating the eccentric cam 15 is energized only when the pinch roller 3 is placed in engagement with and disengagement from the capstan shaft 6, it is possible to decrease power consumption.

Furthermore, the eccentric cam 15 is permitted to continue its rotation for a while after it has urged the pinch roller arm 4, the reverse rotation of the eccentric cam is prevented by the arm 4 biased by the C-shaped spring so that after the pinch roller 3 has once been urged against the capstan shaft 6, the pinch roller 3 will not disengage the capstan shaft 6.

Instead of using a geared motor, it is also possible to use any power source which produces rotary motion, for example, a low speed motor or a rotary solenoid.

What is claimed is:

1. A pinch roller mechanism comprising a source of rotary motion, an eccentric cam coupled to said source of rotary motion and adapted to be rotated by said source, a capstan shaft, a pinch roller, an arm normally urged against the side surface of said eccentric cam and supporting said pinch roller, spring means of different spring forces for urging said pinch roller against said capstan shaft when said eccentric cam is rotated by said source of rotary motion, and control means for controlling energization of said source.

2. A pinch roller mechanism according to claim 1 which comprises said arm provided with a pin urged by said spring means to engage the side surface of said eccentric cam, stop means for stopping rotation of said eccentric cam after a portion of the side surface thereof most remote from an axis of rotation of said eccentric cam has passed by said pin, and a switch located at a position corresponding to said stop means for deenergizing said source of rotary motion.

3. A pinch roller mechanism according to claim 2 wherein a ball bearing having a race is provided to surround said eccentric cam and said pin is urged against the outer side surface of said race.

* * * * *